United States Patent [19]
Shimada et al.

[11] Patent Number: 6,014,132
[45] Date of Patent: *Jan. 11, 2000

[54] ELECTRONIC DEVICE

[75] Inventors: Kazutoshi Shimada, Kawasaki; Eisaku Tatsumi, Yokohama; Noriyuki Suzuki, Tokyo, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/173,864

[22] Filed: Dec. 23, 1993

Related U.S. Application Data

[63] Continuation of application No. 07/790,435, Nov. 12, 1991, abandoned.

[30] Foreign Application Priority Data

Nov. 20, 1990 [JP] Japan ................................. 2-312641

[51] Int. Cl.[7] ................................................. G09G 5/00
[52] U.S. Cl. ............................................. 345/173; 345/211
[58] Field of Search ..................................... 345/173, 168, 345/169, 213, 211, 212, 179–183; 341/22

[56] References Cited

U.S. PATENT DOCUMENTS

| | | |
|---|---|---|
| 4,317,181 | 2/1982 | Teja et al. . |
| 4,649,373 | 3/1987 | Bland et al. ............................ 340/711 |
| 4,814,760 | 3/1989 | Johnston et al. ........................ 340/707 |
| 5,059,961 | 10/1991 | Cheng ...................................... 345/211 |

FOREIGN PATENT DOCUMENTS

| | | |
|---|---|---|
| 0050844 | 5/1982 | European Pat. Off. . |
| 0391543 | 10/1990 | European Pat. Off. . |
| 60-198619 | 10/1985 | Japan . |
| 2024712 | 1/1990 | Japan . |

OTHER PUBLICATIONS

"System Power Savings By Automatic Sleep Mode", IBM Technical Disclosure Bulletin, vol. 29, No. 9, Feb. 1987, pp. 4122–4124.

"Cursor Controller/Graphics Pad", IBM Technical Disclosure Bulletin, vol. 28, No. 9, Feb. 1986, pp. 4093–4097.

*Primary Examiner*—Regina Liang
*Attorney, Agent, or Firm*—Fitzpatrick, Cella, Harper & Scinto

[57] ABSTRACT

An electronic device for entering information comprises a CPU for controlling the entire electronic device, information entry means for obtaining information at a predetermined time interval, and control means for controlling the CPU and the information input means such that, in a first mode in which no information is entered, the predetermined time interval is maintained in preparation for sudden entry of information and an operating clock frequency of the CPU is kept at a low frequency, and in a second mode in which information is entered, the predetermined time interval is maintained and the operating clock frequency of the CPU is kept at a high frequency.

8 Claims, 5 Drawing Sheets

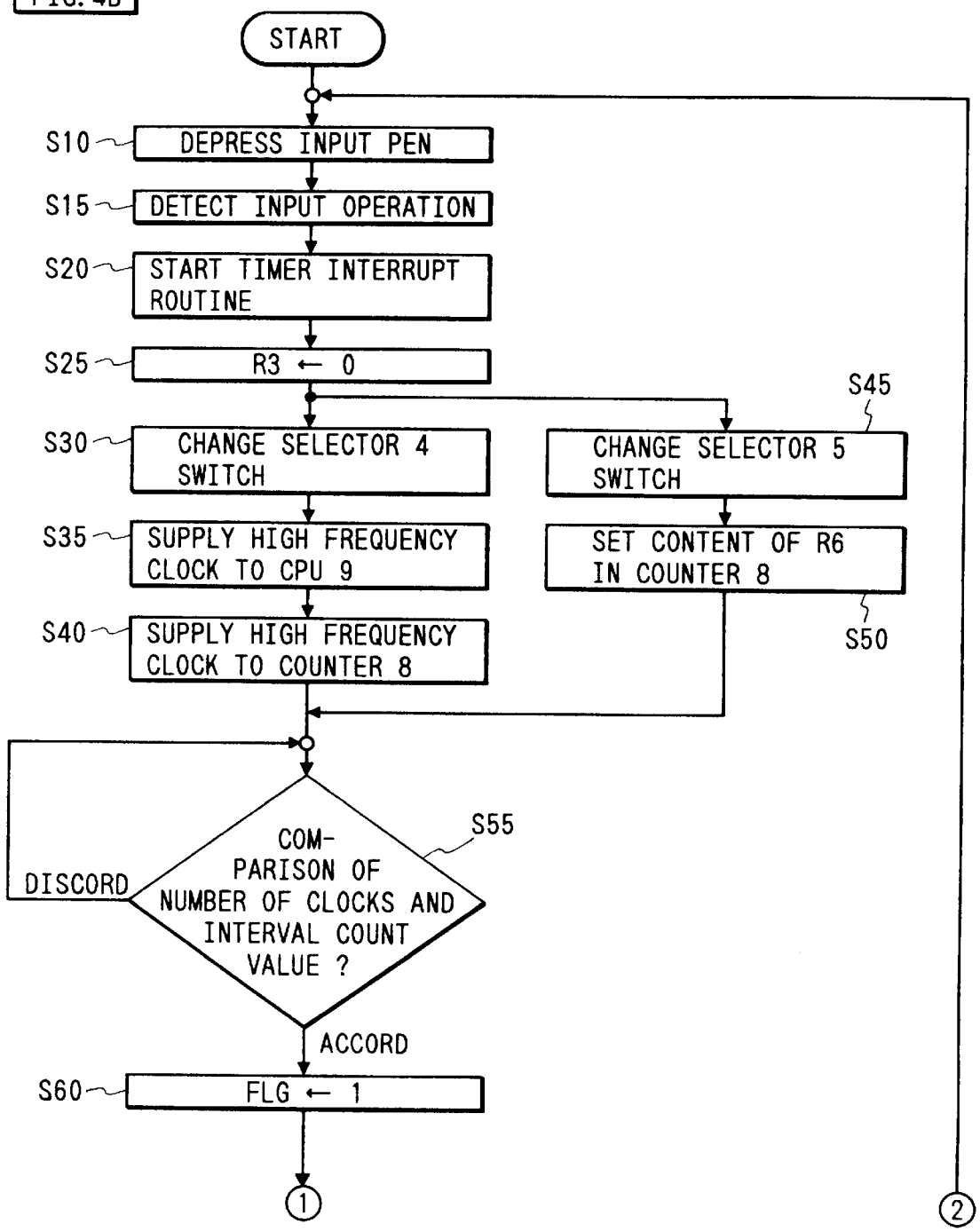

ELECTRONIC DEVICE

This application is a continuation of application Ser. No. 07/790,435, filed Nov. 12, 1991, now abandoned.

BACKGROUND OF THE INVENTION

1. Field of the Invention

The present invention relates to an electronic device, and more particularly to a hand-writing entry device.

2. Related Background Art

In an electronic device powered by a battery, a power saving approach has been taken by providing a stand-by mode and an operation mode. In one example, in the stand-by mode to wait an input, a clock frequency supplied to a CPU and an operation/control unit is lowered. By this method, an interrupt request time of an interval timer for key scan may be elongated. Thus, in an entry device such as a keyboard in which input information is identified only after several times of scan, even if the key scan interval is long in the stand-by mode, the clock frequency may be returned to the normal one for the operation mode after the key entry has been detected by the first key scan. Accordingly, the device operates effectively.

However, where the entry device is a digitizer, for example, which enters information by hand writing, the precision of position information given by the input directly relates to the precision of character recognition. Accordingly, even if the CPU clock is returned to the normal clock frequency at the first input timing, the position information of the input data cannot be obtained with a sufficient precision and the precision of character recognition is lowered. In order to solve the above problem, it is necessary to always keep the CPU clock at the high frequency of the operation mode. This leads to another problem of increasing a power consumption.

SUMMARY OF THE INVENTION

It is an object of the present invention to provide an electronic device which implements a power saving approach and obtains information of hand-written input with a high input precision.

The electronic device for entering information in accordance with the present invention comprises a CPU for controlling the entire electronic device, information entry means for obtaining information at a predetermined time interval, and control means for controlling the CPU and the information input means such that, in a first mode in which no information is entered, the predetermined time interval is maintained in preparation for sudden entry of information and an operating clock frequency of the CPU is kept at a low frequency, and in a second mode in which information is entered, the predetermined time interval is maintained and the operating clock frequency of the CPU is kept at a high frequency.

It is another object of the present invention to provide an electronic device which, in a first mode of operation, maintains a predetermined time interval for obtaining information and keep an operating clock frequency of a CPU at a low frequency, and in a second mode, maintains the predetermined time interval for obtaining the information and keeps the operating clock frequency of the CPU at a high frequency.

It is a further object of the present invention to provide an electronic device comprising:

input means for entering information;

a processing unit for processing the information from the input means;

first control means for rendering a frequency of an operating clock of the processing unit to a low frequency in a first mode in which no information is entered by the input means and rendering the frequency of the operating clock of the processing unit to a high frequency in a second mode in which information is entered from the input means; and second control means for maintaining a constant information entry period of the input means between the first mode and the second mode.

It is still a further object of the present invention to provide an electronic device comprising:

input means for entering information;

a processing unit for processing the information from the input means;

first control means for rendering a frequency of an operating clock of the processing unit to a low frequency in a first mode and rendering the frequency of the operating clock of the processing unit to a high frequency; and second control means for maintaining a constant information entry period of the input means for different frequencies of the operating clock selected by the control means.

It is another object of the present invention to provide an electronic device comprising:

clock generation means;

input means for entering information at a predetermined timing based on the clock from the clock generation means;

a processing unit for processing the information from the input means based on the clock from the clock generation means;

first control means for applying the clock from the clock generation means such that a frequency of an operating clock of the processing unit is kept at a low frequency in a first mode and the frequency of the operating clock of the processing unit is kept at a high frequency in a second mode;

means for maintaining the operation of the input means such that the input means enters the information at the predetermined timing when the control means alters the operating clock to the processing means; and second control means for maintaining a constant information entry period of the input means between the first mode and the second mode.

It is a further object of the present invention to provide an electronic device for entering information comprising:

a processing unit for controlling the electronic device;

information input means for entering information at a predetermined time interval; and control means for controlling the processing unit and the information input means such that the predetermined time interval is maintained in preparation to the information entry and a frequency of an operating clock of the processing unit is rendered to a high frequency in a first mode in which no information is entered.

DETAILED DESCRIPTION OF THE PREFERRED EMBODIMENTS

Figure 1:
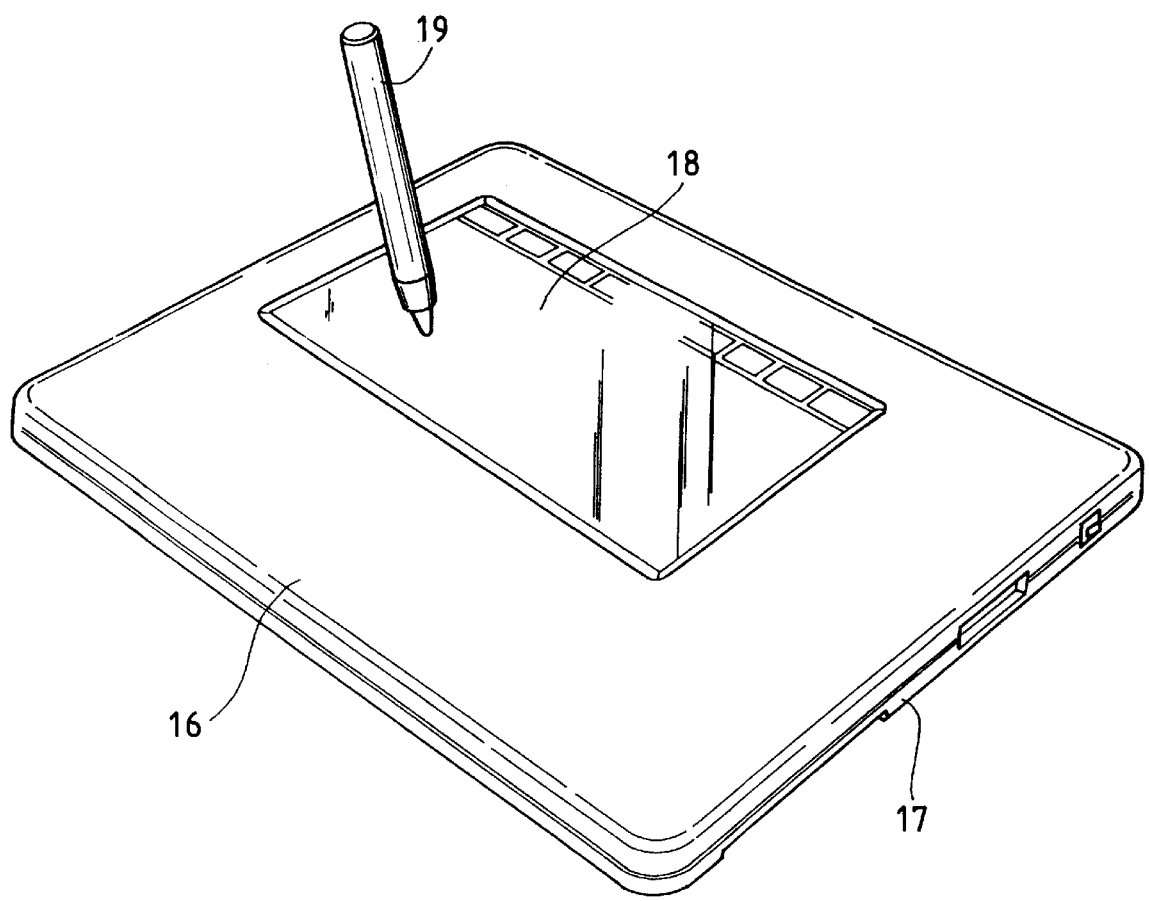
FIG. 1 shows an external view of hand-writing information entry device in accordance with a typical embodiment of the present invention.

The preferred embodiments of the present invention are now explained with reference to the accompanying drawings. FIG. 1 shows an external view of a hand writing information entry device in accordance with a representative embodiment of the present invention. In FIG. 1, numerals 16 and 17 denote upper and lower cases, numeral 18 denotes an integral input/output screen comprising a transparent digitizer and a liquid crystal and numeral 19 denotes an input pen for writing into the digitizer. In the present device, the digitizer and the display are integrated to facilitate the viewing of the hand-written input and it is displayed by the liquid crystal just beneath the hand writing input position.

In the present embodiment, the transparent digitizer adopts a resistor film system so that two glass plates or PET films having resistor films are held at an interval of several tens $\mu$m. A voltage is applied to the two glass plates or PET films having the resistor films. When a user of the device presses the glass plate or PET by the input pen 19, the two resistor films contact and a current flows. By detecting the current, the device detects the position on the input/output screen 18 at which the information was entered and reads coordinate data thereof at a predetermined resolution.

Figure 2:
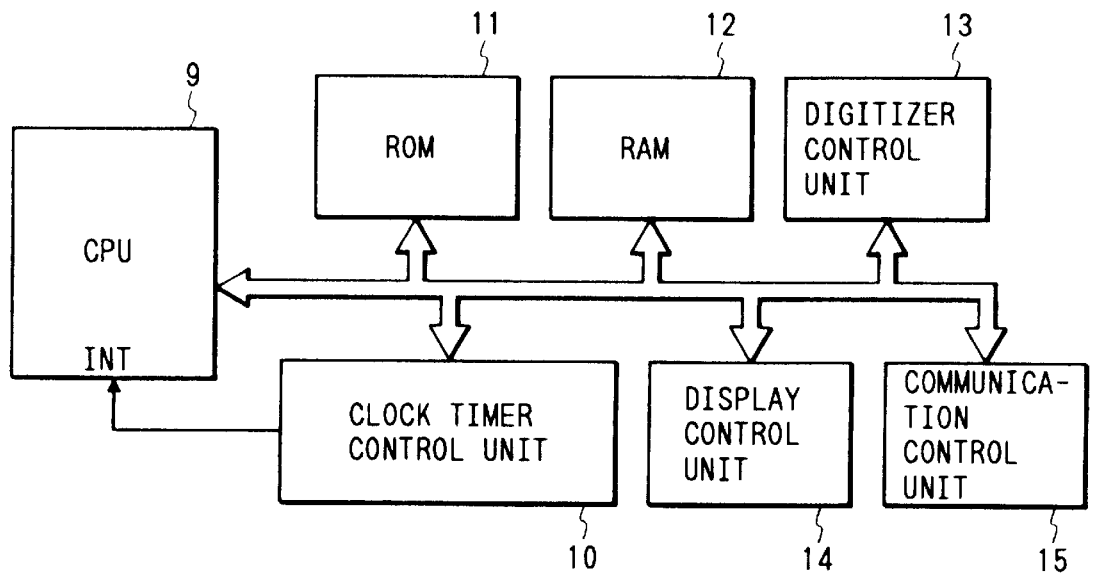
FIG. 2 shows a block diagram of a configuration of the hand-writing information entry device.

FIG. 2 shows a block diagram of a configuration of the hand writing information entry device of the present invention. In FIG. 2, numeral 9 denotes a CPU such as a 16-bit one-chip MPU which carries out an operation/control process, numeral 10 denotes a clock timer control unit, numeral 11 denotes a ROM which stores application programs such as a normal routine for carrying out a hand writing information entry process to be described later and a timer interruption routine, a dictionary and a type font, numeral 12 denotes an SRAM with a backup which is used as a work area or a RAM, numeral 13 denotes a digitizer control unit which outputs coordinate information in accordance with an interval time to be described later, numeral 14 denotes a display control unit which displays information on the display, and numeral 15 denotes a communication control unit for controlling the communication with an external device (for example, a printer of a personal computer).

Figure 3:
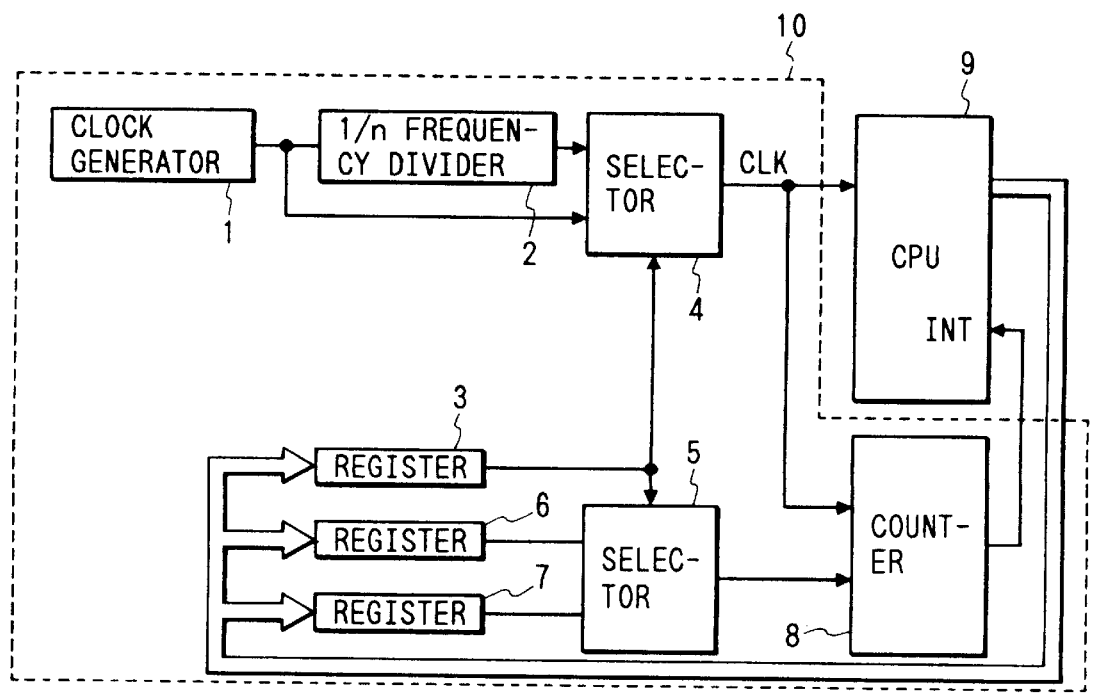
FIG. 3 shows a block diagram of a detailed configuration of a clock timer controller.

FIG. 3 shows a block diagram of a detailed configuration of the clock timer control unit 10. In FIG. 3, the clock timer control unit 10 comprises a clock generator 1 having a crystal oscillator (for example, having an oscillation frequency of approximately 4 MHz), a 1/n frequency divider 2 for converting a clock frequency to a lower frequency, a register 3 (R3) which is a one-bit register for accepting an operation mode or stand-by mode setting command from the CPU 9, a selector 4 for selecting one of the clock frequency supplied from the clock generator 1 and the low clock frequency supplied from the 1/n frequency divider 2, a selector 5 for selecting one of the output from a register 6 and the output from a register 7, the register 6 (R6) which is an 8-bit register to which the content of the interval timer set by the CPU 9 is set in the operation mode, the register 7 (R7) which is an 8-bit register to which the content of the interval timer set by the CPU 9 is set in the stand-by mode, and a counter 8.

Figure 4B:
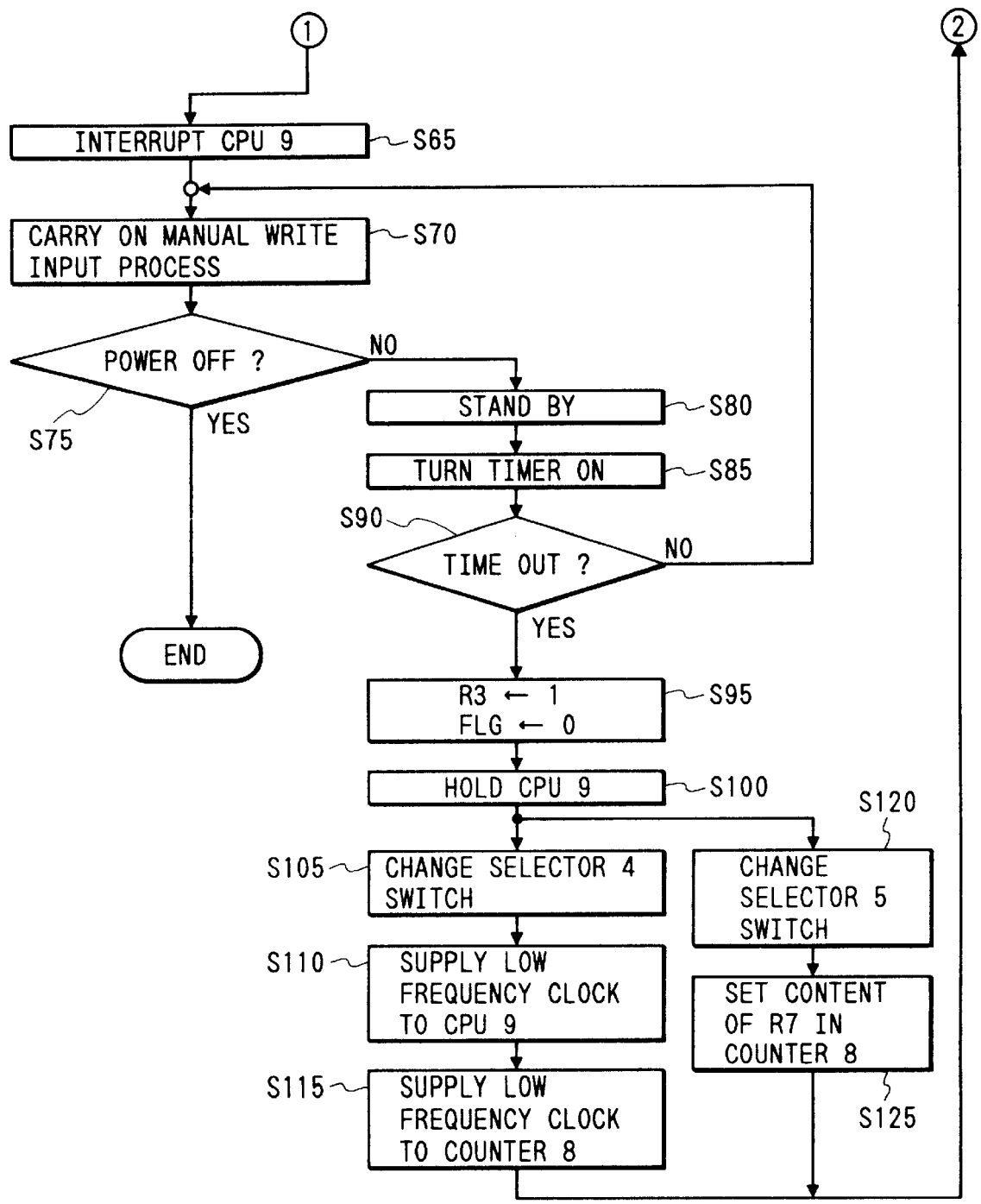
FIG. 4 shows a flow chart of a power saving control process.

A power saving process to save a power consumption of the hand writing information entry device is now explained with reference to a flow chart shown in FIG. 4. In the present embodiment, it is assumed that the CPU 9 sets a predetermined interval time (for example, 20 m sec) for the operation mode and the stand-by mode, to the registers R6 and R7, and at an initial state the hand writing information entry device is in the stand-by mode.

In a step S10, when the user of the hand writing information entry device tries to enter hand writing information to the input/output screen 18 by using the input pen 19, the input pen 19 presses the input/output screen 18.

In a step S15, the two resistor films of the digitizer contact by the pressure and the current is detected. In a step S20, a timer interruption routine to release the stand-by mode is started.

When the timer interruption routine is started, the CPU 9 sets an operation mode command to R3 (the bit of R3 is set to "0") in a step S25 to shift the device to the operation mode.

The bit set in R3 is supplied to the selectors 4 and 5 as the select signal. When the bit is "0", the selector 4 selects the normal clock from the clock generator 1, and if the bit is "1", it selects the low frequency clock from the 1/n frequency divider 2, and supplies it to the CPU 9 and the counter 8. On the other hand, the selector 5 selects the interval time count set in R6 if the bit is "0" and selects the interval time count set in R7 if the bit is "1", and supplied it to the counter 8.

For example, when the clock frequency of the clock generator 1 is 4 MHz and the n of the 1/n frequency divider 2 is 4, the clock frequency supplied from the 1/n frequency divider 2 is 1 MHz. On the other hand, when the interval time for obtaining the hand writing input information from the input/output screen 18 of the hand writing entry device is 20 ms, the interval time count is $80 \times 10^3$ (=20 ms/4 MHz) in the operation mode, and $20 \times 10^3$ (=20 ms/1 MHz) in the stand-by mode. The interval time is kept constant by changing the interval time count in accordance with the clock frequency. The CPU 9 controls the digitizer control unit 13 in accordance with the interval time to read the coordinate data.

The one-chip MPU used in the present embodiment usually comprises MOS FET's. In such an MPU, a current flows and a power is consumed only when a voltage level in the MPU changes from high to low or from low to high in accordance with the clock frequency. Thus, the power consumption of the MPU can be controlled by changing the operating clock frequency of the MPU.

In this case, since the device mode switches from the stand-by mode to the operating mode, the selector 4 is switched in a step S30, the clock at the operating mode frequency from the clock generator 1 is supplied to the CPU 9 in a step S35, and the clock from the clock generator 1 is supplied to the counter 8 in a step S40.

The selector 5 is switched in a step S45 in parallel to the steps S30 and S40, and the interval time count in R6 is set to the counter 8 in a step S50.

In a step S55, the coincidence of the count of the counter 8 for the number of clocks from the clock generator 1 with the interval time count of the operating mode supplied from R6 is monitored, and when they coincide, the process proceeds to a step S60. In the step S60, an input flag (FLG) is set to "1", and in a step S65, the CPU 9 is interrupted so that it returns to the normal routine from the timer interruption routine.

In the normal routine, the hand writing input process is carried. out in a step S70 in accordance with the input coordinates at which the information is entered and in accordance with the interval time, by the CPU 9 through the digitizer control unit 13. The hand writing input process (such as detection of the input coordinates and recognition of the hand-written input) is done by a prior art technique.

After the hand writing input process, the process proceeds to a step S80 to be ready to receive the next hand-written input so long as the power turn-off operation is not carried out in a step S75. In a step S85, the timer is activated to shift the device to the stand-by mode.

In a step S90, the time is monitored in accordance with the timer count set in the step S85. When the next hand-written input is detected within a predetermined time, the process returns to the hand writing input process of the step S70. On the other hand, if there is no next hand-written input within the predetermined. time, the process proceeds to a step S95 to set "0" to the input flag (FLG) and "1" to R3. In a step S100, the CPU 9 issues a hold command to itself to render the CPU 9 into the hold status.

In a step S105, the selector 4 detects the bit "1" set in R3 and switch the selection. In a step S110, the selector 4 receives the clock from the 1/n frequency divider 2 to supply the low frequency clock to the CPU. In a step S115, it supplies the low frequency clock to the counter 8. In parallel to the steps S105 to S115, the selector 5 detects the bit "1" set in R3 to switch the selection in a step S120. In a step S125, the interval time count set in R7 is supplied to the counter 8.

Thus, the operation shifts from the operation mode to the stand-by mode, and the process returns to the step S10 to wait for the hand-written input in the stand-by mode.

In accordance with the present embodiment, in the stand-by mode, the CPU is set to the hold status in which the CPU is operable at the low clock frequency so that the power consumption is reduced. When the hand writing entry operation takes place in the stand-by mode, the high response hand writing input process is attained because the same interval time as that in the operation mode is set.

Figure 5:
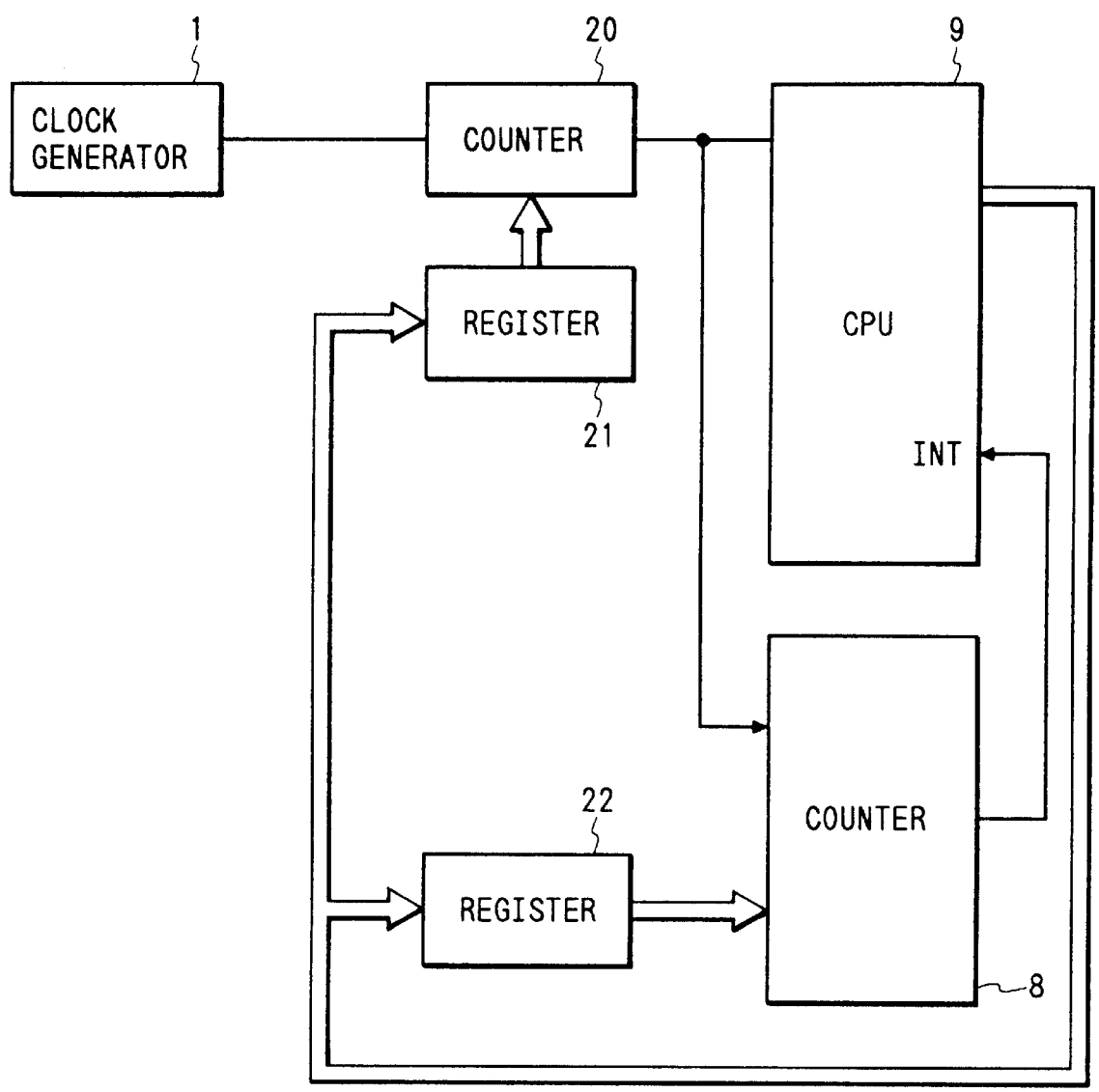
FIG. 5 shows a block diagram of a detailed configuration of the clock timer controller in another embodiment.

In the present embodiment, the bit "0" is set in R2 in the operation mode and the bit "1" is set in the stand-by mode, and the setting to the counter is selected from the contents set in R6 and R7. In an alternative embodiment, as shown in FIG. 5, the interval timer count is directly set from the CPU to the register 22 to set up the interval timer. Also, the 1/n frequency-divided clock frequency is directly set by the register 21.

In this arrangement, the frequency division factor and the interval time can be freely set. Thus, the present embodiment may have more modes than the two selectable modes which the previous embodiment has.

While the hand writing entry device has been explained above, the present invention is not limited thereto. For example, the present invention may be applied to an information monitoring display device in which an input operation does not normally takes place and the device is normally used to display information, and in case of emergency, information is directly entered from a display such as a CRT.

In accordance with the present invention, the information acquisition interval of the electronic device is always kept constant and the CPU operating frequency is switched in accordance with the operation mode of the device. Thus, the CPU operating frequency is lowered while the drop-out of the information input in the stand-by mode is prevented so that the power consumption is reduced.

What is claimed is:

1. An electronic device comprising:
   input means for entering coordinate information;
   a processing means for processing the coordinate information from said input means;
   detecting means for detecting coordinate information from said input means;
   clock signal generating means for generating a clock signal for operating said processing means, said clock signal generating means generating a first clock signal for operating said processing means and a second clock signal for maintaining low power consumption by said processing means, said second clock signal having a frequency different from that of the first clock signal; and
   control means for entering information from said detecting means at a constant common period based on the first clock signal and the second clock signal from said clock signal generating means, said control means having a frequency division factor greater for said first clock signal as compared with that for said second clock signal.

2. An electronic device according to claim 1 wherein said coordinate input means includes indication means for entering the coordinate information.

3. An electronic device according to claim 1 wherein said control means includes a counter for altering the frequency of the operating clock.

4. An electronic device comprising:
   input means for entering coordinate information;
   processing means for processing the coordinate information from said input means;
   detecting means for detecting the coordinate information from said input means;
   clock signal generating means for generating a clock signal for operating said processing means, said clock signal generating means generating a first clock signal for operating said processing means, and a second clock signal for maintaining low power consumption by said processing means, said second clock signal having a frequency different from that of the first clock signal;
   first control means for entering information from said detecting means at a constant common period based on the first clock signal and the second clock signal from said clock signal generating means, said control means having a frequency division factor greater for said first clock signal as compared with that for said second clock signal; and
   second control means, after elapse of a predetermined time since the clock signal generating means generates the first clock signal, for causing the clock signal generating means to generate the second clock signal.

5. An electronic device according to claim 4 wherein said input means includes means for entering coordinate information.

6. An electronic device according to claim 4 wherein said input means includes indication means for entering coordinates.

7. An electronic device according to claim 4 wherein said second control means has a counter for altering the frequency of the operating clock.

8. An electronic device according to claim 4 wherein said input means enters hand-written information.

* * * * *